United States Patent
Sengupta et al.

(10) Patent No.: US 6,883,019 B1
(45) Date of Patent: Apr. 19, 2005

(54) PROVIDING INFORMATION TO A COMMUNICATIONS DEVICE

(75) Inventors: Uttam K. Sengupta, Portland, OR (US); Shreekant S. Thakkar, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/566,620

(22) Filed: May 8, 2000

(51) Int. Cl.[7] .............................................. G06F 15/16
(52) U.S. Cl. ...................... 709/206; 709/224; 709/201; 702/3; 707/3; 713/400; 345/716; 700/157
(58) Field of Search ................................ 709/206, 224, 709/201; 702/3; 707/3; 713/400, 200; 345/716; 700/157; 701/201

(56) References Cited

U.S. PATENT DOCUMENTS

| | | | | |
|---|---|---|---|---|
| 5,475,601 A | * | 12/1995 | Hwang ........................ | 700/157 |
| 5,561,706 A | * | 10/1996 | Fenner ........................ | 455/406 |
| 5,717,923 A | * | 2/1998 | Dedrick ....................... | 707/102 |
| 5,802,253 A | | 9/1998 | Gross et al. | |
| 5,948,040 A | * | 9/1999 | DeLorme et al. ........... | 701/201 |
| 6,134,548 A | * | 10/2000 | Gottsman et al. ............ | 707/5 |
| 6,275,774 B1 | * | 8/2001 | Baron et al. .................... | 702/3 |
| 6,298,307 B1 | * | 10/2001 | Murphy et al. ................ | 702/3 |
| 6,405,318 B1 | * | 6/2002 | Rowland ..................... | 713/200 |
| 6,446,076 B1 | * | 9/2002 | Burkey et al. .............. | 707/102 |
| 6,470,386 B1 | * | 10/2002 | Combar et al. ............. | 709/224 |
| 6,476,825 B1 | * | 11/2002 | Croy et al. ................... | 345/716 |
| 6,498,987 B1 | * | 12/2002 | Kelly et al. ................... | 702/3 |
| 6,564,210 B1 | * | 5/2003 | Korda et al. .................... | 707/3 |

FOREIGN PATENT DOCUMENTS

WO        WO 97/41654      11/1997

OTHER PUBLICATIONS

Erik T. Mueller, "A Calendar with Common Sense". In Proceedings of the 2000 International Conference on Intelligent User Interfaces. Association for Computing Machinery. New York, 2000, pp. 198–201.

* cited by examiner

*Primary Examiner*—William A. Cuchlinski, Jr.
*Assistant Examiner*—Thanh T. Nguyen
(74) *Attorney, Agent, or Firm*—Fish & Richardson P.C.

(57) ABSTRACT

Providing information to a communications device includes determining the relevance of an event to a user based on service choices of the user and, if the event is relevant to the user, determining the relevance of information sources to the event, the information sources including at least data indicating a real-time status of the user, and determining whether to send information about the event to the user based on the information sources.

36 Claims, 2 Drawing Sheets

PROVIDING INFORMATION TO A COMMUNICATIONS DEVICE

BACKGROUND

This invention relates to providing information to a communications device.

A communications device such as a pager, a cellular phone, a personal digital assistant, or a telephone may periodically receive information from a remote source such as a web server connected to the Internet. A user of the communications device can indicate preferences to the remote source such as when and what types of information to send to the communications device. For example, using Yahoo! To Go, the user may set up a schedule indicating the time of day and day of the week to be notified of a preferred city's weather forecast, personal horoscope, and preferred companies' stock prices. Schedules on these remote sources are static; the remote sources send the indicated information to the user the indicated time(s) until the service is terminated.

DESCRIPTION

Figure 1:
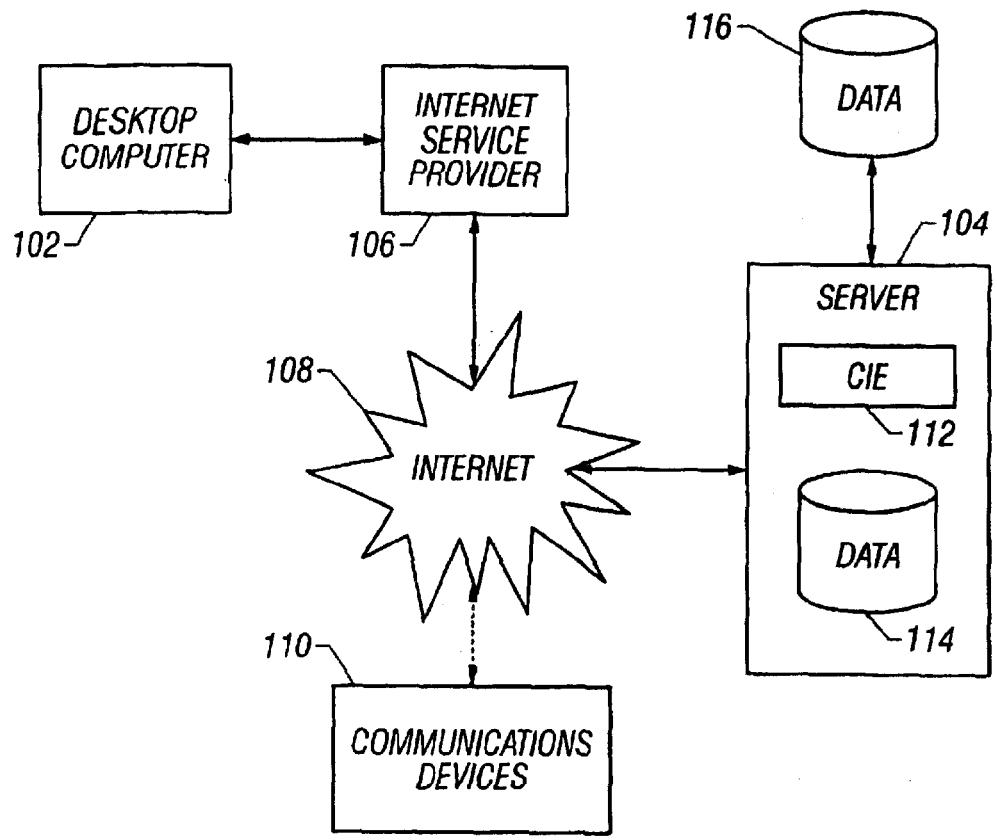
FIG. 1 is a block diagram of a networked communications system.

Referring to FIG. 1, a system 100 includes a desktop computer 102 configured to connect to a server 104 via an Internet service provider (ISP) 106 and an Internet 108. A user of the desktop computer 102 may register with the server 104 and indicate to the server 104, using a specific user identification code that uniquely identifies the user, what services the user wishes to receive on a communications device 110. The user can register with the server 104 using the desktop computer 102 or any device configured to connect to the Internet 108 or other network, e.g., intranet or extranet, connected to the server 104. These services can include what types of information the user wants to receive, when the user wants to receive the information, and what communications device(s) 110 can receive the information. Such communications devices 100 include cellular phones, pagers, computers, personal digital assistants, and other wireless communications devices. Before the server 104 (or hardware and/or software mechanism associated with the server 104) sends any information to one or more of the user's communications devices 110, a context interpretation engine (CIE) 112 helps determine the context of the user. By considering context before sending information, the user receives individualized information relevant to his/her habits, lifestyle, and real-time status.

Figure 2:
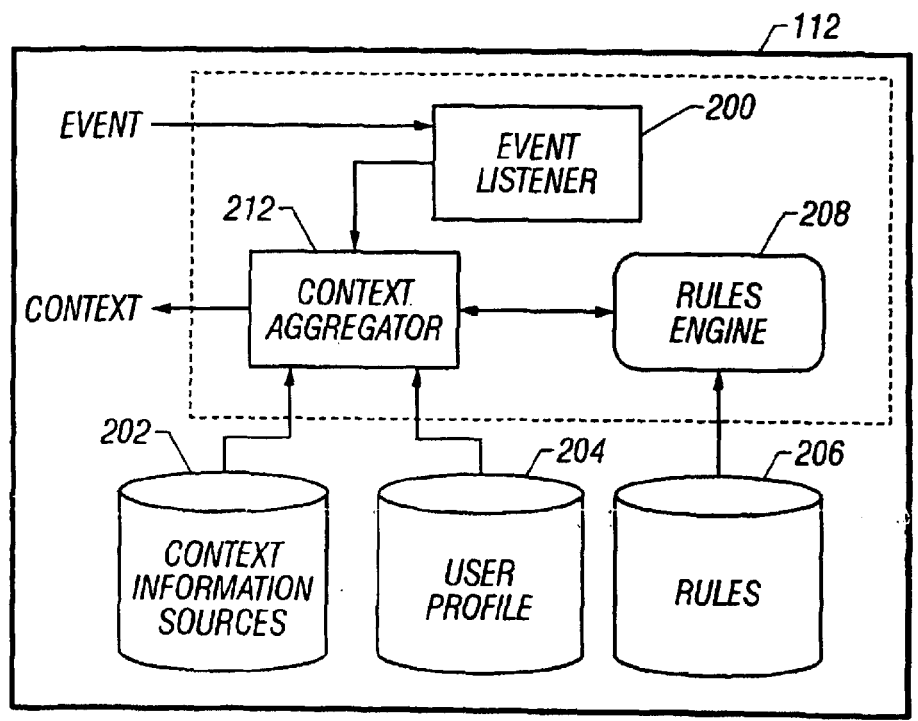
FIG. 2 is a block diagram of a context interpretation engine in accordance with an embodiment of the invention.

Also referring to FIG. 2, the CIE 112 includes an event listener 200, a rules engine 208, and a context aggregator 212 to help determine the user's context. The event listener 200 monitors and detects certain events of potential relevance to users and forwards the events to the context aggregator 212. The context aggregator 212 derives a user context for each event provided to it by the event listener 200 using rules 206 (through the rules engine 208), context information sources 202, and a user profile 204, each organized in one or more collections of data, e.g., databases 114 and 116, included in or accessible by the server 104 and described in more detail below.

Essentially, the current (real-time) and future plans of the user define a user's context. Specifically, context may include information compiled from the context information sources 202 related to the user's:

- location, e.g., latitude and longitude, zip code, wireless cell site, elevation, and time zone;
- mobility status, e.g., stationary or en route to a specific destination, speed, and direction;
- current activity, e.g., type (at home, at desk, at a meeting, in a car, on an airplane, on a train, walking, etc.), duration, people involved, activity site (home, desk, conference room, hotel, freeway, airport, etc.), and subject matter;
- timeline of future activities, e.g., type, duration, people involved, activity site, and subject matter;
- top n (prioritized) items in a to-do list;
- prioritized contact list; and
- event priority, e.g., importance (high, medium, or low) and urgency (high, medium, or low).

This list of context characteristics is not all-inclusive. The context information sources 202 are adapted to allow context characteristics to be added or deleted from consideration.

Some or all of this information can include attribute qualifiers of inferred information that enable the CIE 112 to further define the information (and thus the user's context):

- accuracy, e.g., a global positioning satellite (GPS) based location data is coarse whereas differential GPS location data is precise;
- confidence (duration and source of information determine accuracy), e.g., speed and direction must stay steady for a specific duration before they are deemed accurate;
- disposition, e.g., cannot be disturbed and available through which communication device(s);
- importance level, e.g., associating an importance to an event by evaluating the source of the event (spouse, boss, peer, child, airline, etc.); and
- urgency level, e.g., associating an urgency to an event by evaluating source of the event and impact of the event (flight delayed, change in driving times, meeting moved up, etc.).

Figure 3:
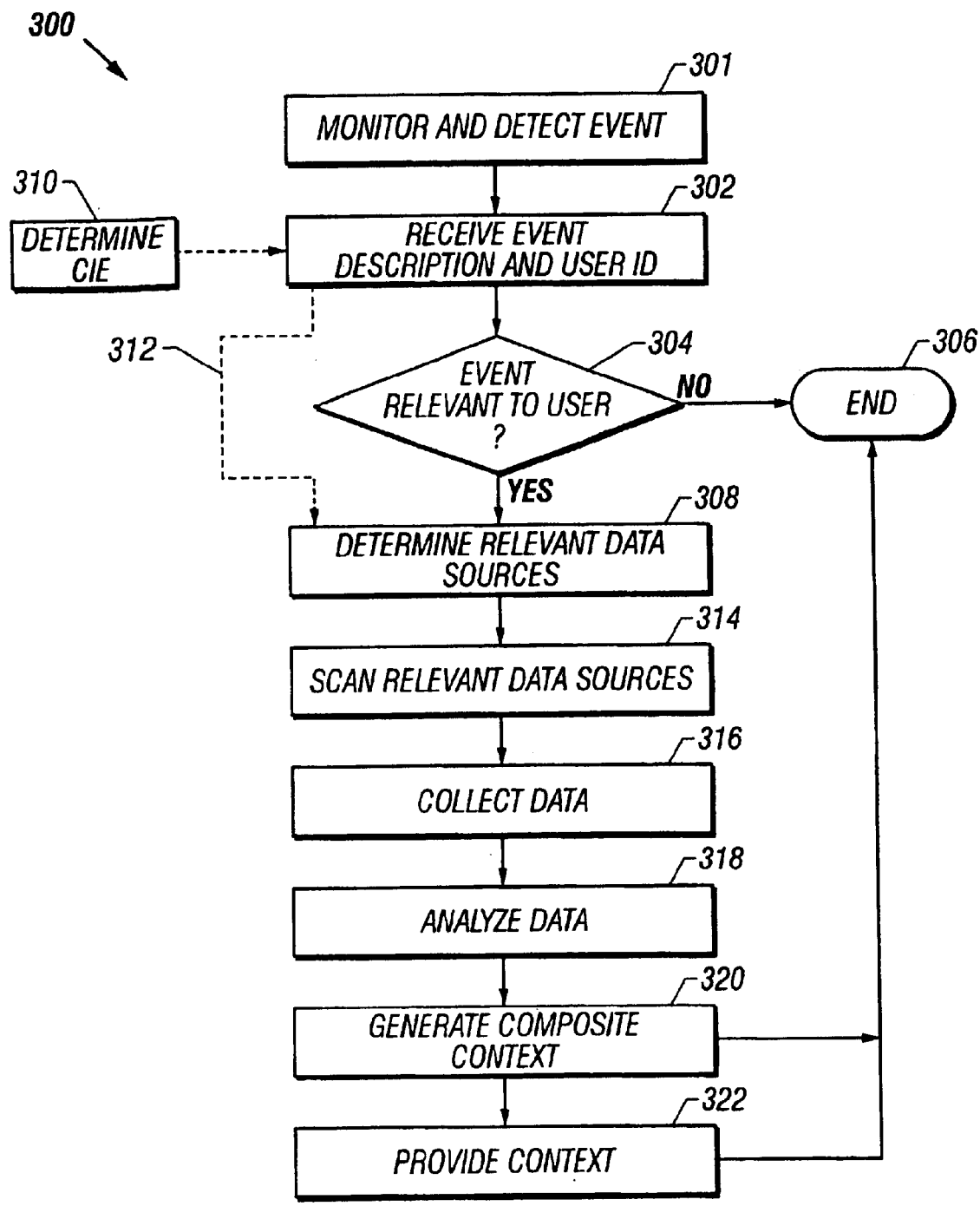
FIG. 3 is a flowchart showing the operation of the context interpretation engine of FIG. 2 in accordance with an embodiment of the invention.

Also referring to FIG. 3, the CIE 112 determines the relevance of an event to registered users and the event's relation to each user's context in a process 300. The CIE 112, using the event listener 200, rules engine 208, and context aggregator 212, implements the process 300 with a software mechanism, i.e., algorithms, though one or more hardware mechanisms may accomplish the same results. Additionally, the server 104 may include more than one CIE 112 to help determine context.

Before the CIE 112 begins determining the user's context for an event, however, the event listener 200 monitors and detects (301) events. The event listener 200 can monitor and detect (301) these events from any information source it is adapted to communicate with, including information sources on the Internet 108, intranets, and extranets. For example, the event listener 200 can register with various information sources and act as a listener for events, meaning it can receive notification from the information sources when the information source adds, deletes, or modifies items (events). The event listener 200 may register to receive notification of all events the information source maintains/controls/detects or just certain categories of events. Events that the event listener 200 may monitor and detect (301) include:

- weather conditions;
- traffic conditions;
- news;
- sports scores;
- travel information, e.g., flight information and directions;
- receipt of electronic mail (email);
- auction status;
- reminders;
- calendar changes;
- stock prices; and
- horoscope.

This list of events is not all-inclusive. The event listener 200 is adapted to allow events to be added, altered, or deleted from monitoring and detection.

Once the event listener 200 detects (301) an event, the context aggregator 212 receives (302) notice of the event including a description of the event and a user identification code. The server 104 provides the user identification code to the event listener 200 and may provide it directly to the context-aggregator 212 rather than through the event listener 200.

The context aggregator 212 determines (304) the relevance 19 of the event to the user's service choices as indicated in the user profile 204. The user profile 204 contains profile information on registered users, usually information provided by the users. Such information can include a user's:

- name;
- home information, e.g., mailing address, telephone number(s), fax number(s), and email address(es);
- work information, e.g., mailing address, telephone number(s), fax number(s), and email address(es);
- communications devices;
- historical (previous) data, e.g., user interaction logs;
- contacts, e.g., names, addresses, telephone numbers, email addresses, birthdays, and anniversaries;
- travel profile, e.g., route taken from home to work, seating preference, special service required, meal preferences, passport information, frequent flier information including airline and identification code, car rental information including car model/size preference and quantity, and hotel information including hotel chain and hotel chain identification code;
- birthday/astrological information;
- news profile, e.g., preferred city(s), preferred subject(s) (world, politics, sports, etc.), and preferred sports and sports teams;
- finance profile, e.g., preferred companies and stock ticker company codes; and
- preferred times to be notified of certain events.

This list is not exhaustive. The user profile 204 is adapted to allow information to be added, altered, or deleted. For example, if the event relates to the closing stock price of company X, the event is not relevant to a user interested in closing stock prices for only companies Y and Z, so the process 300 ends (306). Similarly, if the event relates to the weather conditions of a certain city but the user's calendar indicates that the user will not arrive in that city for a meeting for another three days, the context aggregator 212 can determine that the event is not relevant to the user and the process 300 ends (306). If, alternatively, the closing stock price of company X or the weather information is relevant to the user, the process 300 continues.

If the server 104 includes more than one CIE 112, the server 104 may determine (310) which CIE 112 to send certain user identification codes to based on the types of events or classes of users that each CIE 112 is configured to handle. In that case, the context aggregator 212 receives (302) only the user identification code and avoids (312) determining (304) whether the event is relevant to the user, as the event is relevant to all users considered by that CIE 112. The context aggregator 212 may not receive (302) the user identification code if it has a database of or otherwise has access to all the user identification codes related to a particular event type.

Knowing that the event has bearing on the user's service choices, the context aggregator 212 considers the context information sources 202, the user profile 204, and the rules 206 to formulate a context for the user given the event. The rules 206 include a number of rules sets, each rules set including a number of rules corresponding to a certain type of event, such as the types listed above. The context aggregator 212 determines which rules set applies to the event and informs the rules engine 208 which rules set to use. The rules engine 208 determines (308) what context information sources 202 relate to the event using the rules set and relay that information to the context aggregator 212. Using the rules 206 allows the context aggregator 212 to consider all relevant context information sources 202, infer links between various context information sources 202 based on the user profile 204, and generally provide the flexibility to use heuristics (rules drawn from past experience).

The rules engine 208 determines (308) which context information sources 202 the context aggregator 212 should consider in deriving the user's context for each event. The rules engine 208 is configured to contemporaneously handle multiple requests, e.g., determine (308) the relevant context information sources 202 for a number of users at the same time. The rules engine 208 processes the rules set using a Rete algorithm to determine (308) the relevant context information sources 202, although the rules engine 208 may use any algorithm. The Rete algorithm uses a tree format to match various items based on a series of decisions made at a number of nodes in the tree. The rules engine 208 uses the rules 206 in the rules set as tree nodes. Paths through the various nodes end in a determination (308) of what context information sources 202 relate to the event. In a simplified example, if the event relates to a traffic problem at the intersection of U.S. Route 26 and Interstate 405 in Portland, Oreg. that is expected to clear in two hours, the rules engine 208 could determine relevant context information sources 202 as including the user's physical location, mobility status, current activity, and future activities. The rules engine 208 informs the context aggregator 212 to query these context information sources 202 in determining the user's context.

Once the rules engine 212 determines (308) the relevant context information sources 202, the rules engine 208 sends an indication of the relevant context information sources 202 to the context aggregator 212. The context aggregator 212 scans (314) the relevant context information sources 202 for context information relevant to the event and collects (316) the relevant context information. This scanning (314) and collecting (316) includes consulting the user profile 204 and/or the rules 206 (through the rules engine 208). The context aggregator 212 sends the collected information to the rules engine 208 with the rules set(s) to use in processing the information. Some examples of the rules 206 in the rules sets include:

if the location information is stale (older than x minutes) then use the user's calendar to determine the user's location;

if the location information is from a GPS, then associate an accuracy of one hundred meters (or any distance measure) to the location;

if the location information is provided by a wireless carrier associated with the user's communications device 110 then associate an accuracy of ten meters to the location;

if the location information is from a differential GPS then associate an accuracy of five meters to the location;

using any of the above rules to determine speed and/or direction and the accuracy of the speed/direction;

if the location accuracy is high (less than five meters) then find one zip code and time zone for the user;

if the location accuracy is medium (between five and fifty meters) then use a radius to determine zip codes and time zones;

if speed and direction are steady for a period of t seconds then associate a confidence, e.g., high, medium, or low, with whether the user is moving;

if new email is from a contact having relationship k with the user, e.g., spouse, boss, peer, child, etc., then mark the email with an importance, e.g., high, medium, or low;

if the user is in a meeting with his/her boss then mark disposition as unavailable for low and medium priority email;

if the user is on an airplane then mark disposition as unavailable;

if the time of day is night, e.g., past 9:00 pm local time, then set disposition as unavailable for low and medium priority email;

if the time of day is sleep time, e.g., past 10:00 pm local time, then set disposition as unavailable;

if the event is flight related, e.g., flight cancelled, delayed, or rerouted, then use the user profile 204 to determine contacts that need to be notified; and if a meeting is cancelled then analyze and prioritize the top n items in the user's to-do list.

In the traffic problem example above, collected relevant context information could include that the user is:

in a meeting at a particular location at work;
accessible by pager and cellular phone;
stationary in a wireless cell site twenty-four; and
scheduled to be at work for the next four hours.

Preferably, the context aggregator 212 can collect (316) context information on the user's location because location may dominate a user's context. For example, the user may be at a movie or giving a speech at a business conference and not want any communications. In determining a user's location from the relevant context information, the context aggregator 212 preferably collects (316) location information according to this hierarchy, from most accurate and desirable to the least: latitude/longitude coordinates from a global positioning system, zip code, calendar, or other context information source 202. The context aggregator also can collect (316) any location information available in the user profile 204 or relevant context information source 202.

After collecting (316) the relevant context information, the context aggregator 212 analyzes (318) the relevant context information and generates (320) a composite context that defines the user's probable context. Analyzing (318) the relevant context information includes adding semantics to the relevant context information such as key words usable by the server 104. The context aggregator analysis also includes examining the relevant context information to see if the event is not relevant to the user in light of the relevant context information, preferably through the rules engine 208. For example, in the traffic example above, the context aggregator 212 may consider that the user prefers contact by pager from the user profile 204, but decide that the event is not relevant because the user will be at work until after the traffic problem is expected to clear. Thus, the context aggregator 212 ignores the event based on the user's current and future context and the process 300 ends (306). If, however, the user was scheduled to leave work in an hour and travel in an area including the location of the traffic problem, the context aggregator 212 generates (320) the composite context.

Generating (320) the composite context includes consulting the user profile 204 and the rules 206 (through the rules engine 208). For example, if the context aggregator 212 collects (316) location information from the user's calendar, the context aggregator 212 can use historical context information in the user profile 204 to predict the user's location using one or more rules 206. Using historical context information allows the context generation to be adaptive over time. Alternatively or in addition, the context aggregator 212 may consult the rules 206 to take the incomplete or stale location information and make a best guess as to the user's location. This prediction feature can be applied to any of the relevant context information. In generating (320) the composite context, the context aggregator 212 can prioritize the events and include the priority of when to send each event to the user based on the analysis of the context information sources 202. For example, an event currently occurring or an event occurring in two hours can take priority over an event occurring in six hours.

Once generated (320), the context aggregator 212 provides (322) the composite context, preferably in extensible markup language (XML), to the server 104 (or the mechanism associated with the server). The server 104 (or the mechanism) can then send the event to one or more of the user's communications devices 110, and then the process 300 ends (306).

Other embodiments are within the scope of the following claims.

What is claimed is:

1. A method, comprising:

determining a context of a user including both real-time information about the user and future plans of the user, said context being determined from a stored profile indicative of user information, and also indicative of future plans of the user, and also based upon context information sources which represent real-time context of the user;

obtaining information about multiple events based on various information sources;

interpreting said context about the user using at least one parameter related to inferred information about the context of the user, and determining a relevance of each of the multiple events to the user based on both the real-time information about the user and future plans of the user; and sending some of said information about events to the user, and not sending other information about the events to the user, based on said interpreting.

2. The method as in claim 1, wherein said real-time information includes a user's current location.

3. A method as in claim 1, wherein said real-time information includes a user's current activity as determined from a calendar of events correlated with a time of day.

4. A method as in claim 1, wherein said inferred information relates to inferred accuracy of said context.

5. A method as in claim 1, wherein said inferred information relates to importance level of a specified event.

6. A method as in claim 1, wherein said multiple events include kinds of conditions for each of a plurality of different areas, and said sending comprises sending information based on the user's area.

7. A method as in claim 1, wherein said context of the user further includes a user profile.

8. A method as in claim 7, wherein the user profile includes information from which a user's current activity can be determined.

9. A method as in claim 8, wherein said current information activity includes at least a route taken from home to work.

10. A method as in claim 1, wherein said sending comprises using rules to evaluate context which includes at least a physical location, a mobility status, a current activity and future activities.

11. A method as in claim 4, wherein said inferred information includes a time since which the information was obtained.

12. A method as in claim 7, wherein said user profile includes information indicative of different kinds of events which interest the user.

13. An article comprising a computer readable medium which stores computer executable instructions, which are executed on a computer to cause the computer to:

determine a context of a user including both real-time information about the user and future plans of the user, said context being determined from a stored profile indicative of user information, and also indicative of user future plans, and also based upon context information sources which represent real-time context of the user;

obtaining information about multiple events based on various information sources;

interpreting said context about the user using at least one parameter related to inferred information about the context of the user, and determining a relevance of each of the multiple events to the user, based on both the real-time information about the user and based on said context information; and sending some of said information about events to the user, and not sending other information about the events to the user, based on said said interpreting.

14. The article as in claim 13, wherein said real-time information includes a user's current location.

15. An article as in claim 13, wherein said real-time information includes a user's current activity as determined from a calendar of events correlated with a time of day.

16. An article as in claim 13, wherein said inferred information relates to inferred accuracy of said context.

17. An article as in claim 13, wherein said inferred information relates to importance level of a specified event.

18. An article as in claim 13, wherein said multiple events include kinds of conditions for each of a plurality of different areas, and said sending comprises sending information based on the user's area.

19. An article as in claim 13, wherein said context of the user further includes a user profile.

20. An article as in claim 19, wherein the user profile includes information from which a user's current activity can be determined.

21. An article as in claim 20, wherein said current information activity includes at least a route taken from home to work.

22. An article as in claim 13, wherein said sending comprises using rules to evaluate context which includes at least a physical location, a mobility statue, a current activity and future activities.

23. An article as in claim 16, wherein said inferred information includes a time since which the information was obtained.

24. An article as in claim 19, wherein said user profile includes information indicative of different kinds of event which interest the user.

25. A system, comprising:

a server, having a network connection which is adapted for connection to a network, and storing information about both real-time information about the user and information about future plans of the user, and also storing a profile indicative of the user, and running a routine which obtains information about multiple events from said network, said server also operating to interpret said context about the user using at least one parameter related to inferred information about the the context of the user, and determining a relevance of each of the multiple events in the user based all of the real-time information about the user, the future plans of the user, and the inferred information about the user and using the relevance to determine to send some of said information about events to the user, and not send other information about the events to the user.

26. The system as in claim 25, wherein said reel-time information includes a user's current location.

27. A system as in claim 25, wherein said real-time information includes a user's current activity as determined from a calendar of events correlated with a time of day.

28. A system as in claim 25, wherein said inferred information relates to inferred accuracy of said context.

29. A system as in claim 25, wherein said inferred information relates to importance level of a specified event.

30. A system as in claim 25, wherein said multiple events include kinds of conditions for each of a plurality of different areas, and said sending comprises sending information based on the user's area.

31. A system as in claim 25, wherein said context of the user further includes a user profile.

32. A system as in claim 31, wherein the user profile includes information from which a user's current activity can be determined.

33. A system as in claim 32, wherein said current information activity includes at least a route taken from home to work.

34. A system as in claim 25, wherein said sending comprises using rules to evaluate context which includes at least a physical location, a mobility status, a current activity and future activities.

35. A system as in claim 28, wherein said inferred information includes a time since which the information was obtained.

36. A system as in claim 31, wherein said user profile includes information indicative of different kinds of events which interest the user.

* * * * *